(12) United States Patent
Fukuda et al.

(10) Patent No.: US 10,750,472 B2
(45) Date of Patent: Aug. 18, 2020

(54) WIRELESS TRANSMITTING AND RECEIVING DEVICE AND VEHICLE

(71) Applicant: MAZDA MOTOR CORPORATION, Hiroshima (JP)

(72) Inventors: Katsuhiro Fukuda, Higashihiroshima (JP); Takakazu Yamane, Hiroshima (JP); Yuki Odagawa, Osaka (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/346,744

(22) PCT Filed: Nov. 7, 2017

(86) PCT No.: PCT/JP2017/040015
§ 371 (c)(1),
(2) Date: May 1, 2019

(87) PCT Pub. No.: WO2018/088375
PCT Pub. Date: May 17, 2018

(65) Prior Publication Data
US 2020/0059890 A1 Feb. 20, 2020

(30) Foreign Application Priority Data
Nov. 9, 2016 (JP) .................................. 2016-218617

(51) Int. Cl.
*H04W 68/00* (2009.01)
*H04W 4/38* (2018.01)
(Continued)

(52) U.S. Cl.
CPC ............ *H04W 68/005* (2013.01); *B60N 3/14* (2013.01); *B60R 16/033* (2013.01); *H04W 4/38* (2018.02);
(Continued)

(58) Field of Classification Search
CPC . H04W 68/005; H04W 52/0229; H04W 4/40; H04W 52/028; H04W 4/38; H04W 52/0235; B60N 3/14; B60R 16/033
(Continued)

(56) References Cited

U.S. PATENT DOCUMENTS 9,863,919 B2 * 1/2018 Carrasco Zanini ...... G01D 5/00
10,279,634 B2 * 5/2019 Usami .................. H04B 1/3822
(Continued)

FOREIGN PATENT DOCUMENTS

JP 2000-339578 A 12/2000
JP 2003-058235 A 2/2003
(Continued)

OTHER PUBLICATIONS

International Search Report issued in PCT/JP2017/040015; dated Jan. 23, 2018.
(Continued)

*Primary Examiner* — Amancio Gonzalez
(74) *Attorney, Agent, or Firm* — Studebaker & Brackett PC (57) ABSTRACT

There are provided: a first communication device; a second communication device that communicates wirelessly with the first communication device; and a state detector that outputs state data indicating a state of a predetermined installation place. The first communication device includes: a storage; and a data controller that selectively executes a transmitting operation to transmit the state data to the second communication device and a storing operation to store the state data in the storage. The second communication device includes a signal generator that generates a stop notification signal notifying that the second communication device in operation stops an operation, and stops the operation after transmitting the stop notification signal to the first commu- (Continued)

nication device. The data controller executes the transmitting operation before the stop notification signal is transmitted from the second communication device, and executes the storing operation after the stop notification signal is transmitted from the second communication device.

5 Claims, 7 Drawing Sheets (51) Int. Cl.
*H04W 4/40* (2018.01)
*B60N 3/14* (2006.01)
*B60R 16/033* (2006.01)
*H04W 52/02* (2009.01)

(52) U.S. Cl.
CPC ........... *H04W 4/40* (2018.02); *H04W 52/028* (2013.01); *H04W 52/0229* (2013.01); *H04W 52/0235* (2013.01)

(58) Field of Classification Search
USPC ........................................................ 455/458
See application file for complete search history.

(56) References Cited

U.S. PATENT DOCUMENTS

| | | |
|---|---|---|
| 2005/0099289 A1 | 5/2005 | Arita et al. |
| 2006/0264221 A1 | 11/2006 | Koike et al. |
| 2009/0211940 A1 | 8/2009 | Emoto et al. |
| 2013/0332087 A1 | 12/2013 | Konagai et al. |
| 2014/0073328 A1 | 3/2014 | Ho et al. |
| 2016/0278014 A1 | 9/2016 | Chen |
| 2017/0010183 A1 | 1/2017 | Konagai et al. |
| 2019/0028955 A1* | 1/2019 | Ochiai ................. H04B 17/309 |

FOREIGN PATENT DOCUMENTS

| | | |
|---|---|---|
| JP | 2004-356786 A | 12/2004 |
| JP | 2005-004529 A | 1/2005 |
| JP | 2005-071295 A | 3/2005 |
| JP | 2008-164467 A | 7/2008 |
| JP | 2013-031112 A | 2/2013 |
| JP | 2013-253898 A | 12/2013 |
| WO | 2012/157080 A1 | 11/2012 |

OTHER PUBLICATIONS

Extended European Search Report issued by the European Patent Office dated Oct. 4, 2019, which corresponds to EP17869438.6-1213 and is related to U.S. Appl. No. 16/346,744.
Nikos Giannopoulos et al., "Design guidelines for building a wireless sensor network for environmental monitoring", 2009 13th Panhellenic Conference on Informatics, IEEE, Piscataway, NJ, USA, Sep. 10, 2009, pp. 148-152.

* cited by examiner

WIRELESS TRANSMITTING AND RECEIVING DEVICE AND VEHICLE

TECHNICAL FIELD

The technique disclosed herein relates to a wireless transmitting and receiving device and a vehicle including a plurality of devices that can communicate with each other.

BACKGROUND ART

At a development site of a vehicle, many sensors may be attached to various parts of the vehicle (see Patent Literature 1). Since the sensors of Patent Literature 1 are connected to a data collection device with signal lines, a worker needs to spend a lot of effort to arrange the signal lines between the sensors and the data collection device.

Patent Literature 2 proposes a technique for wirelessly communicating data acquired by a sensor to a data collection device. According to the technique of Patent Literature 2, it is not necessary to carry out work to arrange signal lines between the sensor and the data collection device.

CITATION LIST

Patent Literature

Patent Literature 1: Japanese Patent Application Laid-Open No. 2013-253898
Patent Literature 2: Japanese Patent Application Laid-Open No. 2008-164467

SUMMARY OF INVENTION

Even when data is communicated with a cable or wirelessly, it is necessary to continuously collect data acquired by sensors. In this case, it is desired to be able to continuously collect data without increasing costs of a power supply and the like. However, Patent Literatures 1 and 2 do not sufficiently study this point.

An object of the technique disclosed herein is to provide a wireless transmitting and receiving device and a vehicle capable of continuously collecting data without increasing costs.

To solve the above problem, one aspect of the technique disclosed herein includes:
 a first communication device;
 a second communication device configured to communicate wirelessly with the first communication device; and
 a state detector configured to output state data indicating a state of a predetermined installation place, wherein
 the first communication device includes:
  a storage; and
  a data controller configured to selectively execute a transmitting operation to transmit the state data to the second communication device and a storing operation to store the state data in the storage,
 the second communication device includes a signal generator configured to generate a stop notification signal notifying that the second communication device in operation stops an operation,
 the second communication device stops the operation after transmitting the stop notification signal to the first communication device, and
 the data controller executes the transmitting operation before the stop notification signal is transmitted from the second communication device, and executes the storing operation after the stop notification signal is transmitted from the second communication device.

According to this wireless transmitting and receiving device, the transmitting operation is executed before the stop notification signal is transmitted from the second communication device, and the storing operation is executed after the stop notification signal is transmitted from the second communication device. Therefore, when the state data cannot be transmitted to the second communication device because the second communication device stops the operation, the state data can be stored in the storage.

The object, features, and advantages of the present invention will be more apparent from the following detailed description and the accompanying drawings.

DESCRIPTION OF EMBODIMENT (Point of View of One Aspect According to the Present Disclosure)

First, a point of view of one aspect according to the present disclosure will be described. As described in Patent Literature 1 above, at a development site of a vehicle, corrosion sensors are attached to respective parts of the vehicle, detection data output from the corrosion sensors is stored in a data collection device, and the degree of progress of corrosion in respective parts of the vehicle is examined. In this case, it is necessary to store the detection data output from the corrosion sensors even while an engine of the vehicle is stopped. Therefore, it is considered to supply power from an onboard battery to the data collection device. However, when power is supplied from the onboard battery to the data collection device, power loss of the onboard battery (so-called dead battery) may occur, as described in paragraph [0022] of Patent Literature 1. Therefore, in Patent Literature 1, power is supplied from a dedicated battery different from the onboard battery to the data collection device.

However, if the dedicated battery different from the onboard battery is mounted, costs of the device increase and the device configuration becomes complicated. Therefore, the present inventors have found a configuration that can avoid occurrence of power loss of the onboard battery as much as possible while the dedicated battery is not mounted and power is supplied from the onboard battery to the data collection device.

Embodiment

An embodiment of the present disclosure will be described below with reference to the drawings. Note that in each drawing, similar components are denoted with similar reference symbols, and descriptions thereof will be omitted as appropriate.

Figure 1:
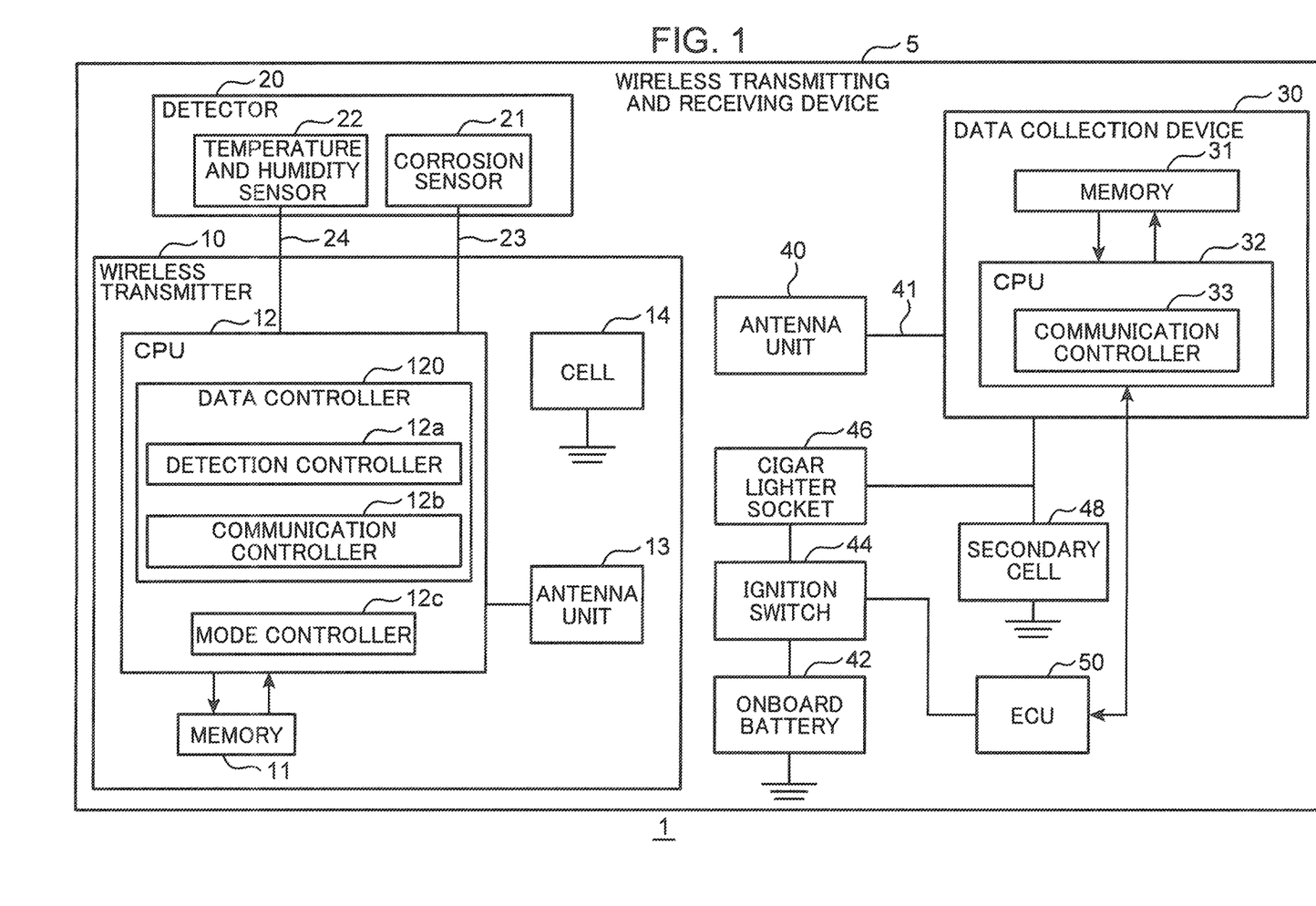
FIG. 1 is a block diagram schematically showing a configuration of a vehicle including a wireless transmitting and receiving device of an embodiment.

FIG. 1 is a block diagram schematically showing a configuration of a vehicle 1 including a wireless transmitting and receiving device 5 of the present embodiment. The vehicle 1 shown in FIG. 1 is, for example, a four-wheeled vehicle. As shown in FIG. 1, the vehicle 1 includes the wireless transmitting and receiving device 5. The wireless transmitting and receiving device 5 includes a wireless transmitter 10, a detector 20, a data collection device 30, an antenna unit 40, an onboard battery 42, an ignition switch 44, a cigar lighter socket 46, a secondary cell 48, and an electronic control unit (ECU) 50.

The vehicle 1 is for evaluating performance of the vehicle using many sensors attached to the vehicle at a development site of a vehicle. In the present embodiment, the detector 20 includes a corrosion sensor 21 and a temperature and humidity sensor 22 as such sensors. The corrosion sensor 21 is connected to the wireless transmitter 10 with a connection cable 23, and the temperature and humidity sensor 22 is connected to the wireless transmitter 10 with a connection cable 24. The antenna unit 40 is connected to the data collection device 30 with a connection cable 41. The vehicle 1 is configured such that detection data of the detector 20 is transmitted wirelessly by the wireless transmitter 10 and is stored in the data collection device 30 via the antenna unit 40.

The corrosion sensor 21 (an example of the state detector) detects the corrosion degree at a place where the corrosion sensor 21 is attached in the vehicle 1. The corrosion sensor 21 may be a general sensor device capable of detecting the degree of corrosion of the vehicle 1. As the corrosion sensor 21, for example, an atmospheric corrosion monitor (ACM) type corrosion sensor may be used.

The temperature and humidity sensor 22 detects the temperature and humidity at a place where the temperature and humidity sensor 22 is attached in the vehicle 1. As the temperature and humidity sensor 22, a general detection device may be used. As the temperature detection device of the temperature and humidity sensor 22, for example, a known platinum resistance thermometer sensor may be used. As the humidity detection device of the temperature and humidity sensor 22, for example, a known polymer capacitive humidity detection device may be used.

Figure 2:
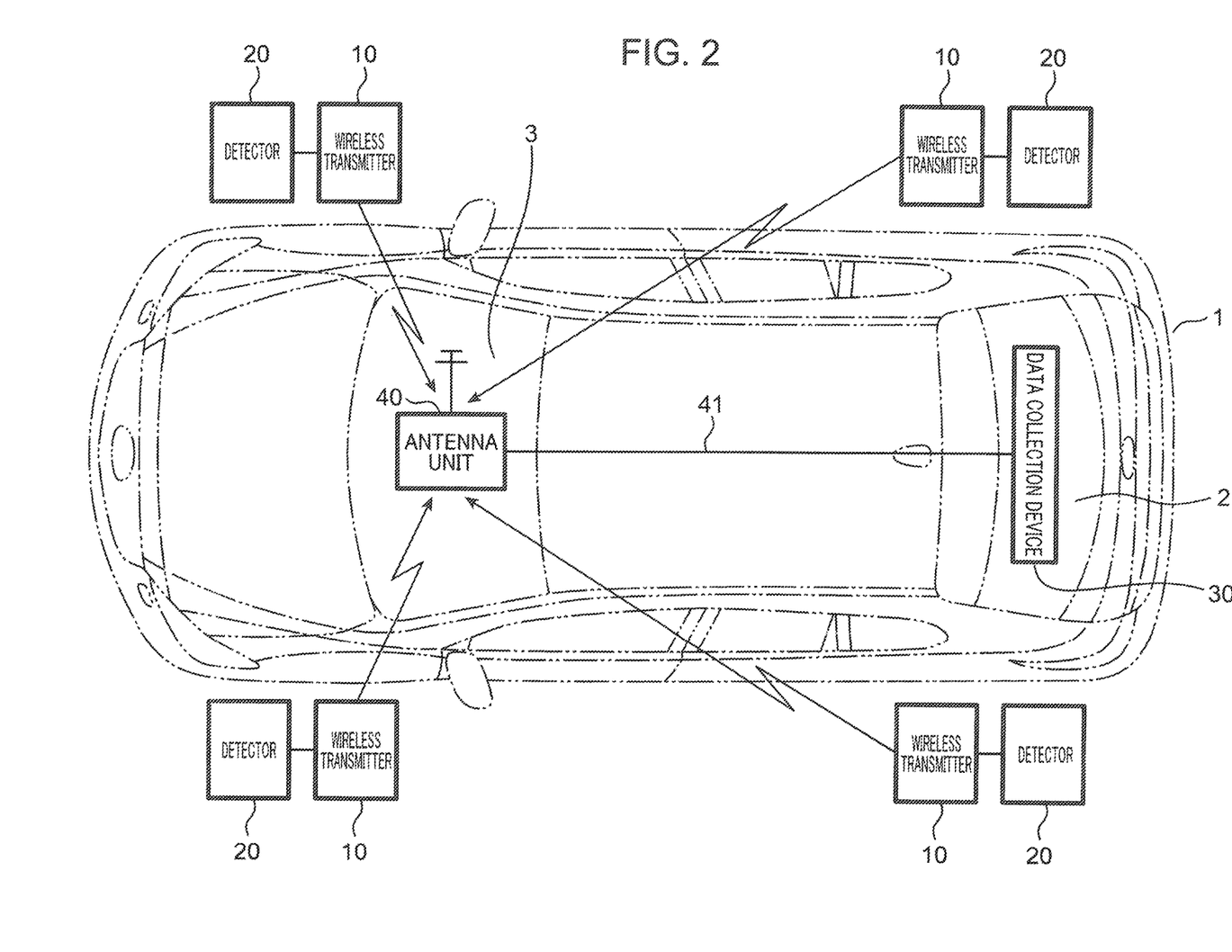
FIG. 2 is a diagram schematically showing an example of disposing wireless transmitters, detectors, a data collection device, and an antenna unit.

FIG. 2 is a diagram schematically showing an example of arrangement of the wireless transmitters 10, the detectors 20, the data collection device 30, and the antenna unit 40.

The detectors 20 are attached to, for example, four places of the vehicle 1 including an engine room, a front wheel house, an outer plate of a lift gate, and an undercover of the engine. The wireless transmitters 10 connected to the detectors 20 with the connection cables 23 and 24 are attached to four places of the vehicle 1 near the detectors 20. The data collection device 30 is disposed, for example, in a trunk room 2 of the vehicle 1. The antenna unit 40 is disposed, for example, on a ceiling of an indoor front portion 3 of the vehicle 1.

Returning to FIG. 1, the wireless transmitter 10 (an example of the first communication device) wirelessly transmits the detection data of the detector 20 to the data collection device 30 (an example of the second communication device). Hereinafter, the data collection device 30 is also referred to as "master", and the wireless transmitter 10 is also referred to as "slave."

The wireless transmitter 10 includes a memory 11, a central processing unit (CPU) 12, an antenna unit 13, a cell 14, and the like. The antenna unit 13 is controlled by the CPU 12, and the antenna unit 13 transmits data and the like by radiating radio waves of a frequency of 2.4 GHz with power of 3 mW in the present embodiment, for example. The antenna unit 13 receives a request signal or the like transmitted from the antenna unit 40. The cell 14 supplies power for operating the memory 11, the CPU 12, the corrosion sensor 21, and the temperature and humidity sensor 22.

The memory 11 (an example of the storage) of the wireless transmitter 10 is configured by, for example, a semiconductor memory such as a flash memory, or other storage devices. The memory 11 includes a memory for temporarily storing the detection data detected by the detector 20, a memory for storing a program, and the like. Note that the memory 11 may be configured by a single memory device including an area for temporarily storing the detection data detected by the detector 20 and an area for storing a program.

As described above with reference to FIG. 2, the detectors 20 and the wireless transmitters 10 are attached to a plurality of places of the vehicle 1 (four places in the present embodiment). Therefore, the memory 11 of each of the four wireless transmitters 10 stores in advance a unique slave ID for identifying each of the wireless transmitters 10.

The CPU 12 functions as a data controller 120 and a mode controller 12c by operating in accordance with the program stored in the memory 11. The data controller 120 functions as a detection controller 12a and a communication controller 12b.

The detection controller 12a acquires, via the connection cable 23, corrosion data detected by the corrosion sensor 21. The detection controller 12a notifies the communication controller 12b of the acquired corrosion data. The detection controller 12a acquires, via the connection cable 24, temperature data and humidity data detected by the temperature and humidity sensor 22. The detection controller 12a notifies the communication controller 12b of the acquired temperature data and the humidity data.

The communication controller 12b generates a transmission signal including the detection data notified from the detection controller 12a (corrosion data, temperature data, and humidity data in the present embodiment), the slave ID, and a data sequence number stored in the memory 11. The data sequence number may be a serial number indicating sequence from the detection data detected first. The communication controller 12b transmits the generated transmission signal from the antenna unit 13.

The mode controller 12c controls an operation mode of the CPU 12 (the data controller 120). The mode controller 12c controls the CPU 12 into a normal mode for performing normal operations and a sleep mode for performing operations of minimum requirement.

The mode controller 12c first causes the CPU 12 to transition from the normal mode to the sleep mode. The mode controller 12c counts elapsed time in the sleep mode, and causes the CPU 12 to transition to the normal mode when a predetermined sampling time elapses. In the normal mode, the detection controller 12a and the communication controller 12b perform predetermined operations. When the predetermined operations are finished, the mode controller 12c causes the CPU 12 to transition to the sleep mode. The life of the cell 14 is extended by this mode controller 12c.

The mode controller 12c causes the CPU 12 to operate in a power on mode when the data collection device 30 is in operation. The mode controller 12c causes the CPU 12 to operate in a power off mode when the operation of the data collection device 30 is stopped. The sampling time differs between the power on mode and the power off mode. A specific example of the sampling time will be described in detail later.

The antenna unit 40 receives the transmission signal including the detection data (corrosion data, temperature data, and humidity data in the present embodiment) of the detector 20 by receiving radio waves radiated from the antenna unit 13. As described above, the antenna unit 40 is connected to the data collection device 30 with the connection cable 41.

The data collection device 30 collects the detection data (corrosion data, temperature data, and humidity data in the present embodiment) of the detector 20. The data collection device 30 includes a memory 31, a CPU 32, and other peripheral circuits. The data collection device 30 is configured by a personal computer, for example.

The memory 31 is configured by a semiconductor memory such as a flash memory, a hard disk, or another storage device, for example. The memory 31 includes a memory for storing the data detected by the detectors 20, a memory for storing a data collection program, a memory for temporarily storing data, and the like. Note that the memory 31 may be configured by a single memory device including an area for storing the data detected by the detectors 20, an area for storing the data collection program, and an area for temporarily storing the data. The memory 31 stores in advance each of the slave IDs of each of the wireless transmitters 10.

The CPU 32 functions as a communication controller 33 by operating in accordance with the data collection program stored in the memory 31. The communication controller 33 stores, in the memory 31, the detection data (corrosion data, temperature data, and humidity data in the present embodiment) of the detector 20 received by the antenna unit 40.

When the ignition switch 44 is turned off, the communication controller 33 (an example of the signal generator) generates an instruction signal instructing a mode change from the power on mode to the power off mode. The communication controller 33 controls transmission of the above instruction signal to each of the wireless transmitters 10. When the ignition switch 44 is turned on after the ignition switch 44 is turned off, the communication controller 33 generates a preparation signal instructing each of the wireless transmitters 10 to prepare data collection. The communication controller 33 controls transmission of the preparation signal to each of the wireless transmitters 10.

In the present embodiment, the instruction signal is an example of the stop notification signal notifying that the data collection device 30 in operation stops the operation. In the present embodiment, the preparation signal is an example of the restart notification signal notifying that the data collection device 30 has restarted the operation after the operation stops.

The onboard battery 42, the ignition switch 44, and the cigar lighter socket 46 are known components mounted on a general vehicle. The cigar lighter socket 46 is connected to a positive electrode of the secondary cell 48, and the positive electrode of the secondary cell 48 is connected to the data collection device 30.

The cigar lighter socket 46 is connected to the onboard battery 42 via the ignition switch 44. Therefore, the onboard battery 42 charges the secondary cell 48 through the cigar lighter socket 46 only while the ignition switch 44 is on (while the engine of the vehicle 1 is operating). The secondary cell 48 is configured to supply power to the data collection device 30 regardless of on-off of the ignition switch 44 (that is, an operating state of the engine of the vehicle 1) in the present embodiment.

The ECU 50 controls the overall operation of the vehicle 1. The ECU 50 detects on-off of the ignition switch 44. The ECU 50 notifies the CPU 32 (the communication controller 33) of the data collection device 30 of the detected on-off state of the ignition switch 44. In other words, the CPU 32 (the communication controller 33) of the data collection device 30 determines the on-off state of the ignition switch 44 based on a signal output from the ECU 50. Note that the ECU 50 and the CPU 32 of the data collection device 30 may be directly connected wirelessly or with a cable, or may be indirectly connected via another controller (CPU).

Figure 3:
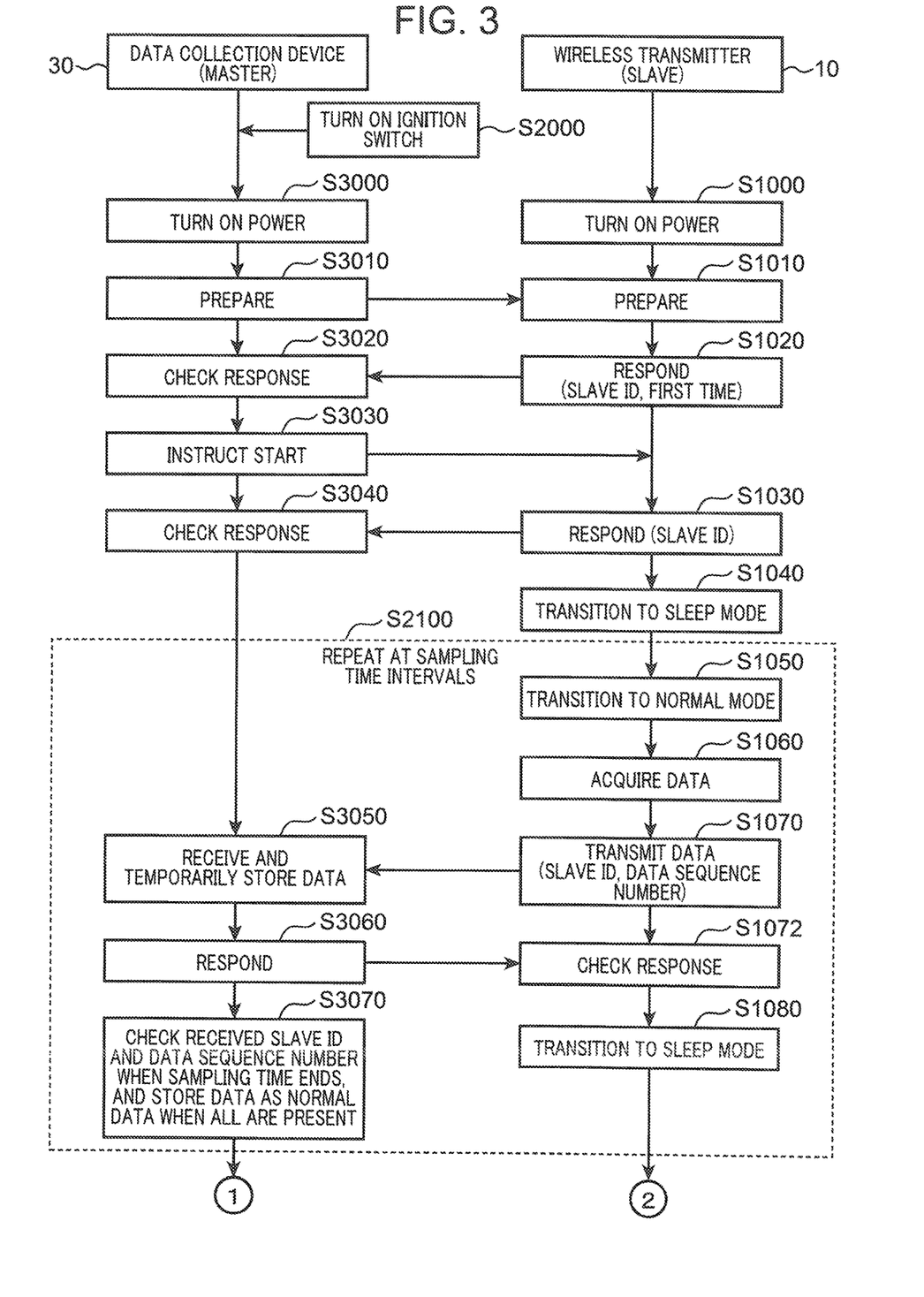
FIG. 3 is a sequence diagram schematically showing one example of an operation of the wireless transmitter and the data collection device.
Figure 4:
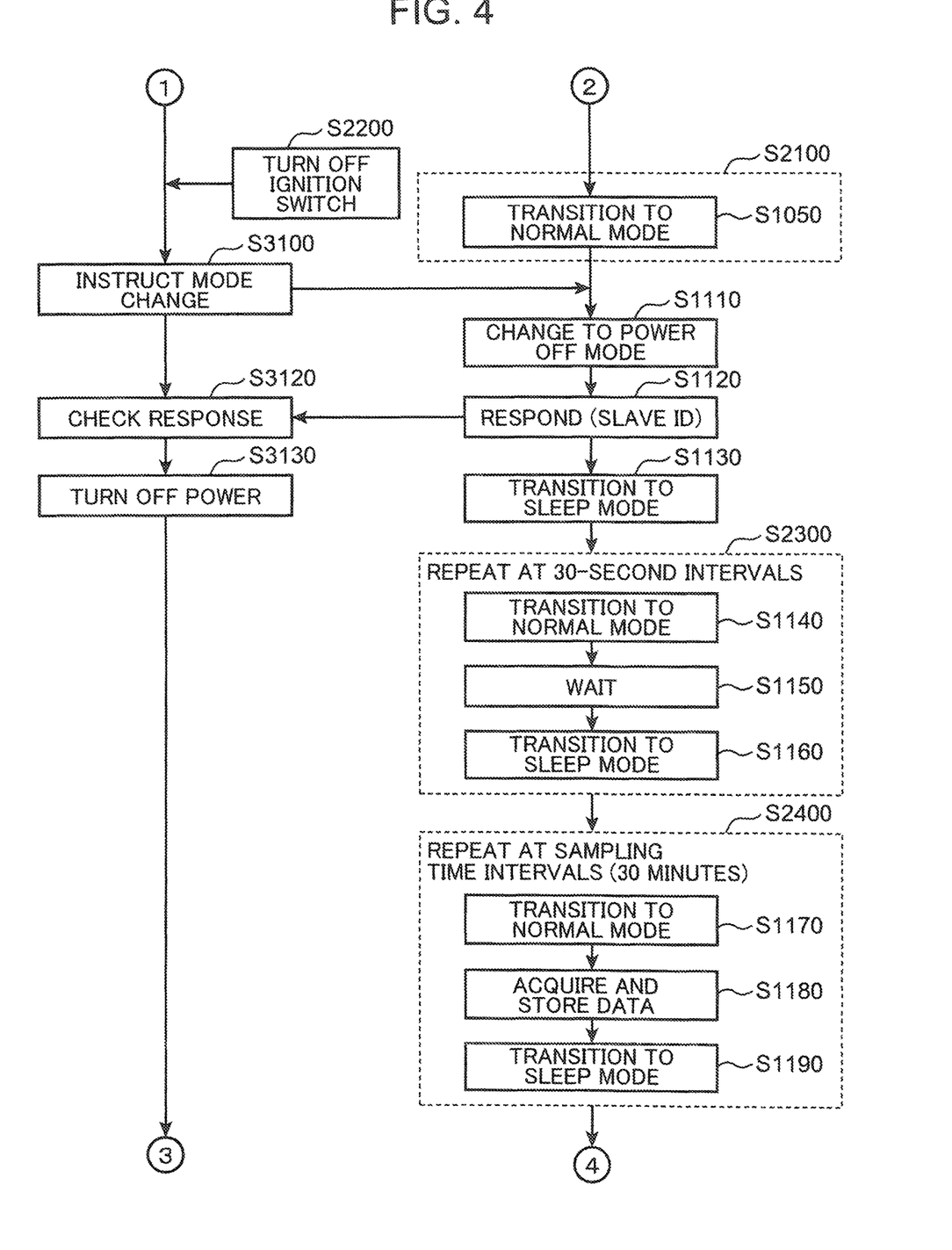
FIG. 4 is a sequence diagram schematically showing one example of the operation of the wireless transmitter and the data collection device.
Figure 5:
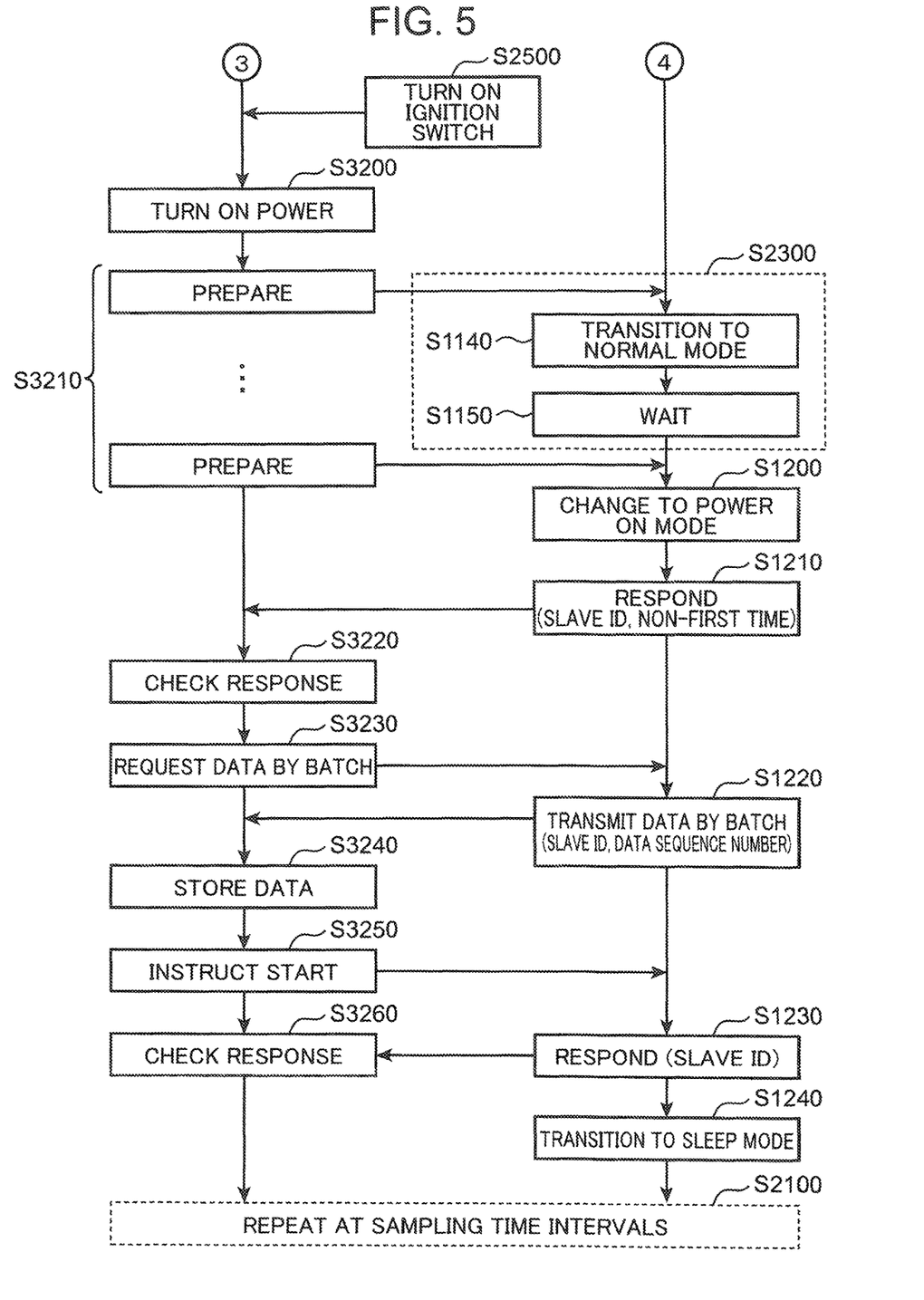
FIG. 5 is a sequence diagram schematically showing one example of the operation of the wireless transmitter and the data collection device.

FIGS. 3 to 5 are sequence diagrams schematically showing one example of the operations of the wireless transmitter 10 (slave) and the data collection device 30 (master).

In step S1000 of FIG. 3, the power of the wireless transmitter 10 is turned on by a user, for example. After the ignition switch 44 is turned on by the user for example, in step S2000, the power of the data collection device 30 is turned on in step S3000.

For example, a configuration may be provided in which the power of the data collection device 30 is turned on when the secondary cell 48 is connected to the data collection device 30 by the user and power supply is started from the secondary cell 48 to the data collection device 30. Instead of or in addition to this configuration, a configuration may be provided in which the power of the data collection device 30 is turned on when the power switch provided in the data collection device 30 is turned on by the user.

In step S3010, the communication controller 33 of the data collection device 30 transmits a preparation signal instructing preparation for data collection to each of the wireless transmitters 10 (four wireless transmitters 10 in the present embodiment as shown in FIG. 2).

In step S1010, the communication controller 12b of the data controller 120 of each of the wireless transmitters 10 starts preparation for data collection. In step S1020, the communication controller 12b transmits, to the data collection device 30, a response signal including the slave ID and a first time signal indicating that this is the first time from power on. In step S3020, the communication controller 33 of the data collection device 30 checks the response signal including the slave ID and the first time signal transmitted from each of the wireless transmitters 10.

In step S3030, the communication controller 33 of the data collection device 30 transmits a start signal instructing to start to collect data to the wireless transmitter 10 corresponding to the slave ID that has responded. The communication controller 12b of the data controller 120 of the wireless transmitter 10 having received the start signal transmits a response signal including the slave ID to the data collection device 30 in step S1030 and notifies the mode controller 12c of the fact that the start signal has been received.

In step S3040, the communication controller 33 of the data collection device 30 checks the response signal transmitted from each of the wireless transmitters 10. In step S1040, in response to the notification that the start signal has been received, the mode controller 12c causes the CPU 12 to transition to the sleep mode.

Step S2100 that follows is repeated at predetermined sampling time intervals (at one-minute intervals in the present embodiment, for example) of the power on mode. First, in step S1050, the mode controller 12c causes the CPU 12 to transition to the normal mode. In step S1060, the detection controller 12a supplies power from the cell 14 to the corrosion sensor 21 and the temperature and humidity sensor 22 for operation, and acquires the detection data (corrosion data, temperature data, and humidity data) of the detector 20.

In step S1070, the communication controller 12b of the data controller 120 of each of the wireless transmitters 10 transmits the transmission signal including the detection data acquired in step S1060 to the data collection device 30. As described above, this transmission signal includes the slave ID and the data sequence number in addition to the detection data.

In step S3050, the communication controller 33 of the data collection device 30 receives the transmission signal transmitted from each of the wireless transmitters 10 in step S1070, and temporarily stores the transmission signal in the memory 31.

In step S3060, the communication controller 33 of the data collection device 30 transmits a response signal indicating that the transmission signal has been received to each of the wireless transmitters 10. In step S1072, the communication controller 12b of the wireless transmitter 10 checks the response signal transmitted from the data collection device 30. After checking the response signal, the mode controller 12c causes the CPU 12 to transition to the sleep mode in step S1080.

When the sampling time ends, in step S3070, the communication controller 33 of the data collection device 30 checks the slave ID and the data sequence number included in the transmission signal received in step S3050. When the slave ID and the data sequence number are all present, the communication controller 33 stores the received detection data in association with the slave ID and the data sequence number, in the memory 31 as normal data. Step S2100 described above is executed at sampling time intervals (at one-minute intervals in the present embodiment, for example) of the power on mode.

Subsequently, the ignition switch 44 is turned off by the user in step S2200 of FIG. 4. Meanwhile, even at this time, in the wireless transmitter 10, step S2100 described above is executed at sampling time intervals (at one-minute intervals in the present embodiment, for example) of the power on mode.

Upon determination based on an output signal from the ECU 50 that the ignition switch 44 is turned off, the communication controller 33 of the data collection device 30 generates an instruction signal instructing the mode change from the power on mode to the power off mode in step S3100. The data collection device 30 transmits the instruction signal to each of the wireless transmitters 10.

When the wireless transmitter 10 transitions to the normal mode (step S1050) and then receives the instruction signal from the data collection device 30 (step S3100), in step S1110, the mode controller 12c of the wireless transmitter 10 changes the CPU 12 to the power off mode. In step S1120, the communication controller 12b of the data controller 120 of each of the wireless transmitters 10 transmits, to the data collection device 30, a response signal including the slave ID to the instruction signal of step S3100. In step S1130, the CPU 12 (the data controller 120) of the wireless transmitter 10 transitions to the sleep mode by the mode controller 12c.

In step S3120, the communication controller 33 of the data collection device 30 checks the response signal transmitted from each of the wireless transmitters 10. Thereafter, in step S3130, the power of the data collection device 30 is turned off.

For example, a configuration may be provided in which the power of the data collection device 30 is automatically turned off, when the communication controller 33 determines, based on the output signal from the ECU 50, that the ignition switch 44 is turned off and the processing of steps S3100 and S3120 ends normally. Alternatively, a configuration may be provided in which the power of the data collection device 30 is turned off when the user instructs the data collection device 30 to finish the data collection program while the data collection program stored in the memory 31 is operating. Instead of or in addition to these configurations, a configuration may be provided in which the power of the data collection device 30 is turned off when the power switch provided in the data collection device 30 is turned off by the user.

While the power of the data collection device 30 is off, the CPU 12 of the wireless transmitter 10 repeats the operation of step S2300 at predetermined time intervals (at 30-second intervals in the present embodiment, for example). That is, the CPU 12 (the data controller 120) transitions to the normal mode by the mode controller 12c (step S1140). The CPU 12 (the data controller 120) waits for a predetermined time (five seconds, for example). The communication controller 12b of the data controller 120 determines whether the preparation signal to be transmitted when the power of the data collection device 30 is turned on is transmitted from the data collection device 30 (step S1150). When the preparation signal is not transmitted from the data collection device 30, the CPU 12 (the data controller 120) transitions to the sleep mode by the mode controller 12c (step S1160).

Also, in the power off mode where the power of the data collection device 30 is off, the CPU 12 of the wireless transmitter 10 repeats the operation of step S2400 at sampling time intervals (an example of the predetermined time, at 30-minute intervals in the present embodiment, for example) of the power off mode. That is, the CPU 12 transitions to the normal mode by the mode controller 12c (step S1170). The detection controller 12a operates the corrosion sensor 21 and the temperature and humidity sensor 22 by supplying power from the cell 14, acquires the detection data (corrosion data, temperature data, and humidity data) of the detector 20, and stores the acquired detection data in the memory 11 (step S1180). Thereafter, the CPU 12 transitions to the sleep mode by the mode controller 12c (step S1190). In this step S2400, while the operation of the data collection device 30 is stopped, the detection data of the detector 20 can be acquired at 30-minute intervals, for example.

Subsequently, when the ignition switch 44 is turned on by the user in step S2500 of FIG. 5, the power of the data collection device 30 is turned on in step S3200. Meanwhile, in the wireless transmitter 10, step S2300 described above is executed at 30-second intervals, for example.

In step S3210, the communication controller 33 of the data collection device 30 generates a preparation signal instructing each of the wireless transmitters 10 to prepare data collection. The communication controller 33 continuously transmits the generated preparation signal for a predetermined time (one minute, for example) at predetermined time intervals (for example, at one-second intervals). Meanwhile, in the wireless transmitter 10, step S2300 described above is executed at 30-second intervals, for example.

In FIG. 5, even if the preparation signal is transmitted from the data collection device 30 before step S1140 is executed (step S3210), since the CPU 12 of the wireless transmitter 10 is in the sleep mode, the CPU 12 does not respond. The CPU 12 transitions to the normal mode (step S1140), the CPU 12 waits, and while the communication controller 12*b* of the data controller 120 determines whether the preparation signal is transmitted from the data collection device 30 (step S1150), when the preparation signal is transmitted from the data collection device 30 (step S3210), in step S1200, the CPU 12 checks reboot of the data collection device 30 and changes to the power on mode by the mode controller 12*c* of each of the wireless transmitters 10.

In step S1210, the communication controller 12*b* of the data controller 120 of each of the wireless transmitters 10 transmits, to the data collection device 30, the response signal including the slave ID and a non-first time signal indicating that this is not the first time from power on. In step S3220, the communication controller 33 of the data collection device 30 checks the response signal including the slave ID and the non-first time signal transmitted from each of the wireless transmitters 10.

In step S3230, the communication controller 33 of the data collection device 30 transmits a request signal requesting batch transmission of the stored detection data to each of the wireless transmitters 10 that has transmitted the response signal including the slave ID. In step S1220, the communication controller 12*b* of the data controller 120 of each of the wireless transmitters 10 transmits by batch, to the data collection device 30, the transmission signal including the detection data stored in the memory 11 while the power of the data collection device 30 is off. As described above, this transmission signal includes the slave ID and the data sequence number in addition to the detection data. Note that the data sequence number may be assigned to the detection data after the data sequence number when the power of the data collection device 30 is on, in sequence stored in the memory 11 while the power of the data collection device 30 is off.

In step S3240, the communication controller 33 of the data collection device 30 stores the received detection data in the memory 31 in association with the slave ID.

In step S3250, the communication controller 33 of the data collection device 30 transmits the start signal instructing to start to collect data to the wireless transmitter 10 corresponding to the slave ID that has responded. In step S1230, the communication controller 12*b* of the data controller 120 of the wireless transmitter 10 that has received the start signal transmits the response signal including the slave ID to the data collection device 30 and notifies the mode controller 12*c* of the fact that the start signal has been received.

In step S3260, the communication controller 33 of the data collection device 30 checks the response signal transmitted from each of the wireless transmitters 10. In step S1240, the mode controller 12*c* receives the notification that the start signal has been received, and causes the CPU 12 to transition to the sleep mode. Subsequently, step S2100 (FIG. 3) described above is executed at sampling time intervals (at one-minute intervals in the present embodiment, for example) of the power on mode.

Figure 6:
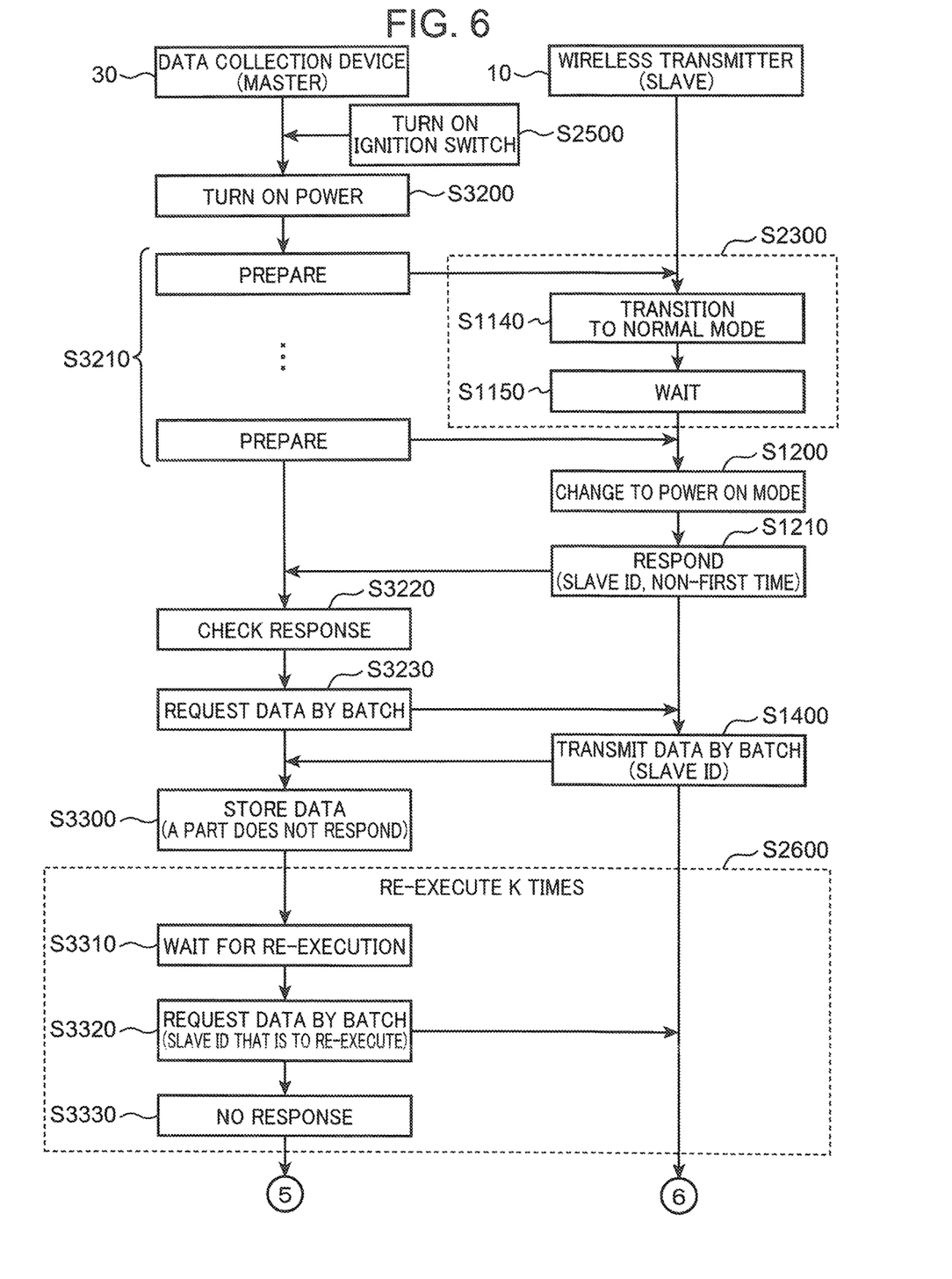
FIG. 6 is a sequence diagram schematically showing one example of the operation when detection data is not transmitted from some wireless transmitter.
Figure 7:
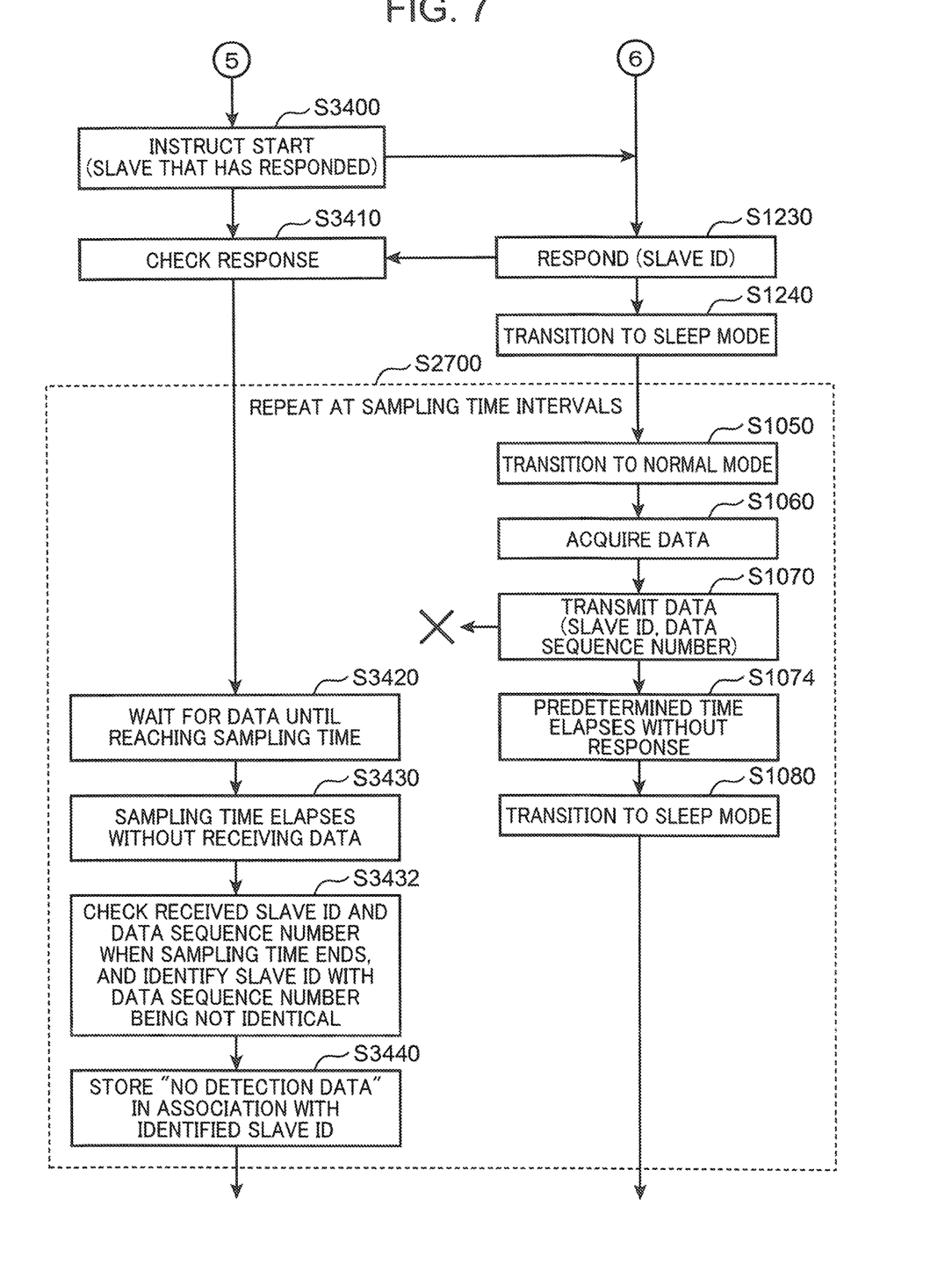
FIG. 7 is a sequence diagram schematically showing one example of the operation when the detection data is not transmitted from some wireless transmitter.

FIGS. 6 and 7 are sequence diagrams schematically showing an example of the operations when the detection data is not transmitted from some wireless transmitter 10 among the four wireless transmitters 10. FIGS. 6 and 7 show the operations from when the operation of the data collection device 30 is restarted (step S2500 of FIG. 5).

Step S2500 of FIG. 6 is the same as step S2500 of FIG. 5. Steps S3200 to S3230 of FIG. 6 are the same as steps S3200 to S3230 of FIG. 5, respectively. Steps S2300, S1140, S1150, S1200, and S1210 of FIG. 6 are the same as steps S2300, S1140, S1150, S1200, and S1210 of FIG. 5, respectively.

Upon receipt of a batch request (step S3230) of data from the data collection device 30, in step S1400, the communication controller 12*b* of the data controller 120 of each of the wireless transmitters 10 transmits the detection data stored in the memory 11 to the data collection device 30 along with the slave ID. At this time, in FIG. 6, it is assumed that the communication controller 12*b* of the data controller 120 of some wireless transmitter 10 does not transmit the detection data.

In step S3300, the communication controller 33 of the data collection device 30 stores the received detection data in the memory 31 in association with the slave ID. At this time, the communication controller 33 has not received the detection data corresponding to some slave ID. Therefore, in step S2600, the communication controller 33 of the data collection device 30 re-executes K times the transmission request of the detection data to the wireless transmitter 10 corresponding to the slave ID from which the communication controller 33 has failed to receive the detection data. In the present embodiment, K=3 for example.

First, in step S3310, the communication controller 33 of the data collection device 30 waits for a predetermined time (5 seconds for example) to re-execute the data transmission request. In step S3320, the communication controller 33 of the data collection device 30 transmits the request signal for requesting batch transmission of the stored detection data to the wireless transmitter 10 corresponding to the slave ID that is to re-execute the transmission. In step S3330, if the detection data is not transmitted even after waiting for a predetermined time (10 seconds for example), the communication controller 33 of the data collection device 30 determines that there is no response.

After step S2600 is repeated K times, the process proceeds to step S3400 of FIG. 7. In step S3400, the communication controller 33 of the data collection device 30 transmits the start signal instructing to start to collect data to the wireless transmitter 10 corresponding to the slave ID that has transmitted the detection data by batch. In step S1230, the communication controller 12*b* of the data controller 120 of the wireless transmitter 10 that has received the start signal transmits the response signal including the slave ID to the data collection device 30 and notifies the mode controller 12*c* of the fact that the start signal has been received.

In step S3410, the communication controller 33 of the data collection device 30 checks the response signal transmitted from each of the wireless transmitters 10. In step S1240, the mode controller 12*c* receives the notification that the start signal has been received, and causes the CPU 12 to transition to the sleep mode. Subsequently, step S2700 is executed at sampling time intervals (at one-minute intervals in the present embodiment for example) of the power on mode, as in step S2100 (FIG. 3) described above.

In step S2700, an example will be described in which the detection data of the detector 20 transmitted from the wireless transmitter 10 is not received by the data collection device 30, or an example will be described in which the wireless transmitter 10 does not transmit the detection data of the detector 20 to the data collection device 30, due to a failure or the like. Steps S1050, S1060, and S1070 to be executed by the wireless transmitter 10 in step S2700 are the same as steps S1050, S1060, and S1070 of FIG. 3, respectively.

In FIG. 7, since the detection data is not received by the data collection device 30, the response signal is not transmitted from the data collection device 30. Therefore, if a predetermined time elapses without receiving the response signal in step S1074, the mode controller 12*c* causes the CPU 12 to transition to the sleep mode in step S1080. The predetermined time of step S1074 is shorter than the sampling time, and is 10 seconds in the present embodiment for example.

Meanwhile, in the data collection device 30, in step S3420, the communication controller 33 waits for the detection data transmitted from the wireless transmitter 10 until reaching the sampling time. When the sampling time elapses without receiving the detection data in step S3430, the communication controller 33 checks the slave ID and the data sequence number received from the wireless transmitter 10 in the current normal mode when the sampling time ends in step S3432. Then, the communication controller 33 identifies the slave ID, from among all the slave IDs, whose data sequence number is not identical to that of other slave IDs. In step S3440, the communication controller 33 stores "no detection data" in the memory 31 in association with the slave ID identified in step S3432.

As described above, in the present embodiment, when the ignition switch 44 is turned off (step S2200 of FIG. 4), the power of the data collection device 30 is turned off (step S3130 of FIG. 4) and the operation of the data collection device 30 is stopped. Therefore, according to the present embodiment, it is possible to prevent occurrence of power loss of the onboard battery 42.

Also, in the present embodiment, while the power of the data collection device 30 is turned off (step S3130 of FIG. 4) and the operation of the data collection device 30 is stopped, the detection controller 12*a* of the data controller 120 of the wireless transmitter 10 acquires the detection data of the detector 20 at sampling time intervals (step S2400 of FIG. 4) and stores the detection data in the memory 11 (step S1180 of FIG. 4). Then, when the power of the data collection device 30 is turned on (step S3200 of FIG. 5) and the operation of the data collection device 30 is restarted, the communication controller 12*b* of the data controller 120 of the wireless transmitter 10 transmits by batch the detection data stored in the memory 11 to the data collection device 30 (step S1220 of FIG. 5). The communication controller 33 of the data collection device 30 stores the transmitted detection data in the memory 31 (step S3240). Therefore, according to the present embodiment, the detection data acquired while the operation of the data collection device 30 is stopped can also be stored in the memory 31 of the data collection device 30.

Modified Embodiments (1) In the above embodiment, as shown in FIG. 4, steps S2300 and S2400 are executed separately, but the present disclosure is not limited to this embodiment. For example, a repetition period of step S2300 and a repetition period of step S2400 may be the same. In this case, step S1180 may be executed between step S1140 and step S1150 or between step S1150 and step S1160. In this embodiment, step S2400 may be omitted.

Alternatively, step S2300 may be executed at 30-second intervals normally, and step S1180 may be executed between step S1140 and step S1150 or between step S1150 and step S1160 only at the timing of every 30 minutes. Also in this embodiment, step S2400 may be omitted.

(2) In the above embodiment, the detectors 20 are attached to, for example, four places of the vehicle 1 including the engine room, the front wheel house, the outer plate of the lift gate, and the under cover of the engine, but the present disclosure is not limited to this embodiment. For example, the detectors 20 may be attached to places other than the above four places. Alternatively, the detectors 20 may be attached to three places or less, or may be attached to five places or more. The wireless transmitters 10 are required at least to be attached near the detectors 20.

(3) In the above embodiment, the detector 20 includes the corrosion sensor 21 and the temperature and humidity sensor 22, but the present disclosure is not limited to this embodiment. The detector 20 may include only the corrosion sensor 21, may include only the temperature and humidity sensor 22, and may further include other sensors in addition to the corrosion sensor 21 and the temperature and humidity sensor 22.

(4) In the above embodiment, the secondary cell 48 is provided, but the present disclosure is not limited to this embodiment. The secondary cell 48 may be a cell having a small capacity that can perform the operations of steps S3100, S3110, and S3120 after the ignition switch 44 is turned off (step S2200 of FIG. 4) until the power of the data collection device 30 is turned off (step S3130 of FIG. 4). Alternatively, instead of the secondary cell 48, an electric double layer capacitor may be provided.

In a case where such a secondary cell 48 or an electric double layer capacitor is provided, a configuration may be provided in which power is supplied from the secondary cell 48 or the electric double layer capacitor to the data collection device 30 only when the secondary cell 48 or the electric double layer capacitor is charged (that is, when the ignition switch 44 is on).

(5) In the above embodiment, a configuration may be provided in which power is supplied from the secondary cell 48 to the data collection device 30 only when the secondary cell 48 is charged (that is, when the ignition switch 44 is on).

In such a configuration, a configuration may be provided in which the power of the data collection device 30 is automatically turned on when the ignition switch 44 is turned on, for example.

Also, a configuration may be provided in which the power of the data collection device 30 is automatically turned off, when the communication controller 33 determines that the ignition switch 44 is turned off based on the output signal from the ECU 50, and the processing of steps S3100 and S3120 (FIG. 4) ends normally, for example. Alternatively, a configuration may be provided in which the power of the data collection device 30 is turned off, when the user instructs the data collection device 30 to finish the data collection program while the data collection program stored in the memory 31 is operating. Instead of or in addition to these configurations, a configuration may be provided in which the power of the data collection device 30 is turned off, when the power switch provided in the data collection device 30 is turned off by the user.

(6) In the above embodiment, in step S2100 of FIG. 3, based on a clock signal of the CPU 12 of the wireless transmitter 10, the detection data is acquired at predetermined sampling time intervals (at one-minute intervals in the present embodiment for example) of the power on mode (step S1060), and the acquired detection data is transmitted to the data collection device 30 (step S1070). However, the transmission timing of the detection data is not limited to this embodiment.

For example, upon acquisition of the detection data of the detector 20, the detection controller 12a of the wireless transmitter 10 may store the acquired detection data in the memory 11. The communication controller 33 of the data collection device 30 may transmit a data request signal to the wireless transmitter 10 at predetermined sampling time intervals based on the clock signal of the CPU 32 of the data collection device 30. Upon receipt of the data request signal from the data collection device 30, the communication controller 12b of the wireless transmitter 10 may transmit the latest detection data stored in the memory 11 at that time to the data collection device 30.

This modified embodiment has an advantage that it is possible to synchronize timing at which the data collection device 30 receives the detection data from each of the wireless transmitters 10, and that it is possible to match the number of detection data to be received from each of the wireless transmitters 10.

Note that the specific embodiment described above mainly includes the invention having the following configurations.

One aspect of the technique disclosed here includes:
a first communication device;
a second communication device configured to communicate wirelessly with the first communication device; and
a state detector configured to output state data indicating a state of a predetermined installation place, wherein
the first communication device includes:
    a storage; and
    a data controller configured to selectively execute a transmitting operation to transmit the state data to the second communication device and a storing operation to store the state data in the storage,
the second communication device includes a signal generator configured to generate a stop notification signal notifying that the second communication device in operation stops an operation,
the second communication device stops the operation after transmitting the stop notification signal to the first communication device, and
the data controller executes the transmitting operation before the stop notification signal is transmitted from the second communication device, and executes the storing operation after the stop notification signal is transmitted from the second communication device.

In this aspect, the state detector outputs the state data indicating the state of the predetermined installation place. The second communication device configured to communicate wirelessly with the first communication device includes the signal generator configured to generate the stop notification signal notifying that the second communication device in operation stops the operation. The data controller of the first communication device selectively executes the transmitting operation to transmit the state data to the second communication device and the storing operation to store the state data in the storage. After transmitting the stop notification signal to the first communication device, the second communication device stops the operation. Before the stop notification signal is transmitted from the second communication device, the data controller executes the transmitting operation, and after the stop notification signal is transmitted from the second communication device, the data controller executes the storing operation. Therefore, according to this aspect, when the state data cannot be transmitted to the second communication device because the second communication device stops the operation, the state data can be stored in the storage.

In the above aspect, for example, the first communication device may alternately repeat a normal mode in which the data controller selectively executes the transmitting operation and the storing operation, and a sleep mode in which the data controller executes neither the transmitting operation nor the storing operation. The signal generator may generate a restart notification signal notifying that the second communication device restarts the operation after the operation stops. The second communication device may transmit the restart notification signal to the first communication device upon restarting the operation after the operation stops. The first communication device may transition to the sleep mode when the stop notification signal is transmitted from the second communication device, and temporarily transition from the sleep mode to the normal mode at predetermined time intervals. The data controller may determine whether the restart notification signal is transmitted from the second communication device while the first communication device temporarily transitions to the normal mode.

In this aspect, when the stop notification signal is transmitted from the second communication device, the first communication device transitions to the sleep mode, and temporarily transitions from the sleep mode to the normal mode at predetermined time intervals. The data controller determines whether the restart notification signal is transmitted from the second communication device while the first communication device temporarily transitions to the normal mode. Therefore, according to this aspect, it is possible to determine the restart of the operation of the second communication device while reducing power consumption of the first communication device while the second communication device stops the operation.

In the above aspect, for example, the first communication device may alternately repeat a normal mode in which the data controller selectively executes the transmitting operation and the storing operation, and a sleep mode in which the data controller executes neither the transmitting operation nor the storing operation. The first communication device may transition to the sleep mode when the stop notification signal is transmitted from the second communication device, and temporarily transition from the sleep mode to the normal mode at predetermined time intervals. The data controller may execute the storing operation while the first communication device temporarily transitions to the normal mode.

In this aspect, when the stop notification signal is transmitted from the second communication device, the first communication device transitions to the sleep mode, and temporarily transitions from the sleep mode to the normal mode at predetermined time intervals. The data controller executes the storing operation while the first communication device temporarily transitions to the normal mode. Therefore, according to this aspect, it is possible to store the state data in the storage while reducing the power consumption of the first communication device while the second communication device stops the operation.

In the above aspect, for example, the signal generator may generate a restart notification signal notifying that the second communication device restarts the operation after the operation stops. The second communication device may transmit the restart notification signal to the first communication device upon restarting the operation after the operation stops. When the restart notification signal is transmitted from the second communication device, the data controller may execute, as the transmitting operation, an operation of transmitting, to the second communication device, the state data stored in the storage by the storing operation executed after the stop notification signal is transmitted from the second communication device.

In this aspect, when the restart notification signal is transmitted from the second communication device, the state data stored in the storage by the storing operation executed after the stop notification signal is transmitted from the second communication device is transmitted to the second communication device, as the transmitting operation. Therefore, according to this aspect, it is possible to transmit the state data while the second communication device stops the operation to the second communication device.

In the above aspect, for example, the state detector may include a corrosion sensor that outputs a current value according to a corrosion degree of the installation place as the state data.

In this aspect, the state detector includes the corrosion sensor that outputs the current value according to the corrosion degree of the installation place as the state data. When the second communication device stops the operation, the storing operation to store the current value according to the corrosion degree in the storage as the state data is executed. The corrosion degree of the installation place progresses even while the second communication device stops the operation. Therefore, according to this aspect, the current value according to the corrosion degree that progresses while the second communication device stops the operation can be continuously stored in the storage.

Another aspect of the technique disclosed here is a vehicle including the wireless transmitting and receiving device of the above aspect, further including:
an onboard battery;
an ignition switch configured to start an operation of the vehicle; and
a cigar lighter socket to which power is supplied from the onboard battery when the ignition switch is turned on, and power supply from the onboard battery is stopped when the ignition switch is turned off, wherein
the second communication device is connected to the cigar lighter socket.

In this aspect, the second communication device is connected to the cigar lighter socket to which power is supplied from the onboard battery when the ignition switch is turned on, the power supply from the onboard battery being stopped when the ignition switch is turned off. Therefore, according to this aspect, since the second communication device stops the operation while the ignition switch is off, it is possible to prevent power loss of the onboard battery.

The invention claimed is:

1. A wireless transmitting and receiving device comprising:
a first communication device;
a second communication device configured to communicate wirelessly with the first communication device; and
a state detector configured to detect state data indicating a state of a predetermined installation place, wherein
the first communication device includes:
a cell;
a storage; and
a data controller configured to selectively execute a transmitting operation to acquire the state data from the state detector at first sampling time intervals to transmit the state data to the second communication device without storing the state data in the storage, and a storing operation to acquire the state data from the state detector at second sampling time intervals to store the state data in the storage,
the data controller supplies power to the state detector from the cell to cause the state detector to operate, when acquiring the state data from the state detector,
the state detector includes a corrosion sensor that outputs a current value according to a corrosion degree of the installation place as the state data,
the second communication device includes a signal generator configured to generate a stop notification signal notifying that the second communication device in operation stops an operation,
the second communication device stops the operation after transmitting the stop notification signal to the first communication device,
the data controller executes the transmitting operation before the stop notification signal is transmitted from the second communication device, and executes the storing operation after the stop notification signal is transmitted from the second communication device,
the first communication device alternately repeats a normal mode in which the data controller selectively executes the transmitting operation and the storing operation, and a sleep mode in which the data controller executes neither the transmitting operation nor the storing operation,
the signal generator generates a restart notification signal notifying that the second communication device restarts the operation after the operation stops,
the second communication device transmits the restart notification signal to the first communication device upon restarting the operation after the operation stops,
the first communication device transitions to the sleep mode when the stop notification signal is transmitted from the second communication device, and temporarily transitions from the sleep mode to the normal mode at predetermined time intervals, and
the data controller determines whether the restart notification signal is transmitted from the second communication device while the first communication device temporarily transitions to the normal mode.

2. A vehicle including the wireless transmitting and receiving device according to claim 1, further comprising:
an onboard battery;
an ignition switch configured to start an operation of the vehicle; and
a cigar lighter socket to which power is supplied from the onboard battery when the ignition switch is turned on, and power supply from the onboard battery is stopped when the ignition switch is turned off, wherein
the second communication device is connected to the cigar lighter socket.

3. A wireless transmitting and receiving device comprising:
a first communication device;
a second communication device configured to communicate wirelessly with the first communication device; and a state detector configured to detect state data indicating a state of a predetermined installation place, wherein
the first communication device includes:
a cell;
a storage; and
a data controller configured to selectively execute a transmitting operation to acquire the state data from the state detector at first sampling time intervals to transmit the state data to the second communication device without storing the state data in the storage, and a storing operation to acquire the state data from the state detector at second sampling time intervals to store the state data in the storage,
the data controller supplies power to the state detector from the cell to cause the state detector to operate, when acquiring the state data from the state detector,
the state detector includes a corrosion sensor that outputs a current value according to a corrosion degree of the installation place as the state data,
the second communication device includes a signal generator configured to generate a stop notification signal notifying that the second communication device in operation stops an operation,
the second communication device stops the operation after transmitting the stop notification signal to the first communication device,
the data controller executes the transmitting operation before the stop notification signal is transmitted from the second communication device, and executes the storing operation after the stop notification signal is transmitted from the second communication device,
the first communication device alternately repeats a normal mode in which the data controller selectively executes the transmitting operation and the storing operation, and a sleep mode in which the data controller executes neither the transmitting operation nor the storing operation,
the first communication device transitions to the sleep mode when the stop notification signal is transmitted from the second communication device, and temporarily transitions from the sleep mode to the normal mode at predetermined time intervals, and
the data controller executes the storing operation while the first communication device temporarily transitions to the normal mode.

4. The wireless transmitting and receiving device according to claim 3, wherein
the signal generator generates a restart notification signal notifying that the second communication device restarts the operation after the operation stops,
the second communication device transmits the restart notification signal to the first communication device upon restarting the operation after the operation stops, and
the data controller executes, as the transmitting operation, an operation of transmitting, to the second communication device, the state data stored in the storage by the storing operation executed after the stop notification signal is transmitted from the second communication device, when the restart notification signal is transmitted from the second communication device.

5. A vehicle including the wireless transmitting and receiving device according to claim 3, further comprising:
an onboard battery;
an ignition switch configured to start an operation of the vehicle; and
a cigar lighter socket to which power is supplied from the onboard battery when the ignition switch is turned on, and power supply from the onboard battery is stopped when the ignition switch is turned off, wherein
the second communication device is connected to the cigar lighter socket.

* * * * *